United States Patent [19]
Labaton et al.

[11] Patent Number: 5,524,072
[45] Date of Patent: Jun. 4, 1996

[54] METHODS AND APPARATUS FOR DATA ENCRYPTION AND TRANSMISSION

[75] Inventors: Isaac Labaton, Haifa, Israel; Michael K. Kelly, Phoenix, Ariz.

[73] Assignee: Enco-Tone Ltd., Haifa, Israel

[21] Appl. No.: 244,584

[22] PCT Filed: Dec. 4, 1992

[86] PCT No.: PCT/US92/10492

§ 371 Date: Jun. 17, 1994

§ 102(e) Date: Jun. 17, 1994

[87] PCT Pub. No.: WO93/11619

PCT Pub. Date: Jun. 10, 1993

[30] Foreign Application Priority Data

Dec. 4, 1991 [IL] Israel ............................... 100238

[51] Int. Cl.⁶ ............................................. H04L 9/00
[52] U.S. Cl. ......................................... 380/24; 380/25
[58] Field of Search ........................ 380/23–25, 29, 380/21

[56] References Cited

U.S. PATENT DOCUMENTS 3,544,769 12/1970 Hedin .
4,159,468 6/1979 Barnes et al. .............................. 380/29
4,376,279 3/1983 Perlman et al. ......................... 235/380
4,423,287 12/1983 Zeidler ..................................... 380/23
4,609,777 9/1986 Cargile ..................................... 380/25
4,701,601 10/1987 Francini et al. ......................... 235/449
4,935,961 6/1990 Gargiulo .................................. 380/29
5,022,080 6/1991 Durst et al. .............................. 380/23
5,177,789 1/1993 Covert ..................................... 380/23
5,351,293 9/1994 Michener et al. ........................ 380/21

Primary Examiner—Salvatore Cangialosi
Attorney, Agent, or Firm—Snell & Wilmer

[57] ABSTRACT

The present invention provides methods and apparatus for the transmission of encrypted data along conventional telephone lines using various data transmission techniques, including known dual tone multi-frequency(DMTF) techniques. In accordance with a preferred embodiment of the invention, an exemplary apparatus for transmitting confidential information(data) comprises a portable hand-held module having the confidential data(e.g., credit card account numbers) and a predetermined encryption algorithm embedded therein. The apparatus which receives the encrypted transmission is equipped with an interface computer having decryption circuitry in which the inverse of the forgoing encryption algorithm is embedded.

12 Claims, 3 Drawing Sheets 5,524,072

METHODS AND APPARATUS FOR DATA ENCRYPTION AND TRANSMISSION

TECHNICAL FIELD

The present invention relates, generally, to the electronic transmission of confidential information, and more particularly to methods and apparatus for encrypting and decrypting confidential data for transmission over telephone lines and air waves.

BACKGROUND ART AND TECHNICAL PROBLEMS

Increasing volumes of confidential information are routinely transmitted over public airwaves and telephone lines on a daily basis. In the banking and credit industries, for example, remote access to account information and the ability to transfer substantial sums of money through electronic funds transfers ("EFT") from a telephone, modem, or automatic teller machine ("ATM") are commonplace. Moreover, consumers are becoming more and more accustomed to shopping for goods and services and charging their purchases to credit card accounts in a single telephone transaction.

With the increased popularity of telephone lines and airwaves as the preferred media for the exchange of confidential financial and related information, the need to secure that data from unauthorized access is readily apparent. Indeed, the same factors which facilitate convenient remote access to savings, checking and credit card accounts also permit the unauthorized user of the associated confidential account data to fraudulently access such accounts, resulting in substantial abuse.

Efforts to curb the unauthorized access to and use of confidentially transmitted data have been only moderately successful. For example, the use of a personal identification number ("PIN") to access accounts is ineffective against fraudulent access once the PIN is intercepted. Moreover, the effectiveness of fixed encryption chemes is inherently limited to the extent the encryption scheme may be derived by analyzing intercepted encrypted data.

A method for encoding and decoding confidential data for transmission over public media is therefore needed which is both robust and which is not readily derivable through unauthorized access.

SUMMARY OF THE INVENTION

The present invention provides methods and apparatus for transmitting encoded data along conventional telephone lines using various data transmission techniques, including known dual tone multi-frequency (DTMF) techniques. In accordance with a preferred embodiment of the invention, an exemplary apparatus for transmitting confidential information (data) comprises a portable, suitably hand-held module having the confidential data (e.g., credit card account numbers) and a predetermined algorithm embedded therein. The apparatus which receives the encoded transmission is equipped with an interface computer having decryption circuitry in which the inverse of the foregoing algorithm is embedded.

In accordance with one aspect of the invention, the confidential data is encrypted as a function of the embedded algorithm and converted to DTMF tones. The tones are applied to standard telephone lines and transmitted to the receiving device in a conventional manner. In an alternate embodiment, the confidential data is encrypted as a function of the embedded algorithm and written onto a magnetic strip on a credit card. The credit card is drawn through a conventional card reader whereupon the information is transmitted to the interface computer. Upon receipt of the encrypted data, the inverse of the encryption function is employed to reveal the original data. Unauthorized interception of the encrypted data during transmission will not permit the unauthorized user to misappropriate the original data unless the encryption algorithm is also known.

In accordance with another aspect of the present invention, the encryption algorithm comprises a dynamic mathematical function of time (e.g., Greenwich Mean Time ("GMT")) expressed in terms of, for example, the current year, month, date, hour, and minute. Inasmuch as the same dynamic mathematical function is represented in both the transmitting and receiving devices, the receiving device may unambiguously derive the original data, provided the dynamic function remains unchanged or any changes are compensated for.

In accordance with a further aspect of the present invention, the unauthorized interception of the encrypted data will not permit the use of the information in a fraudulent manner, unless the unauthorized user has knowledge of the precise GMT at the time the data was transmitted, as well as the embedded encryption algorithm incorporating the GMT.

BRIEF DESCRIPTION OF THE DRAWING FIGURES

The subject invention will hereinafter be described in conjunction with the appended drawing figures, wherein like numerals designate like elements, and:

DETAILED DESCRIPTION OF PREFERRED EXEMPLARY EMBODIMENTS

A preferred embodiment of the encryption scheme which is the subject of the present invention is conveniently described in the context of a remote access, credit card account authorization system. Those skilled in the art will appreciate, however, that the subject invention may be employed in any suitable context involving the transmission of encrypted data.

Figure 1:
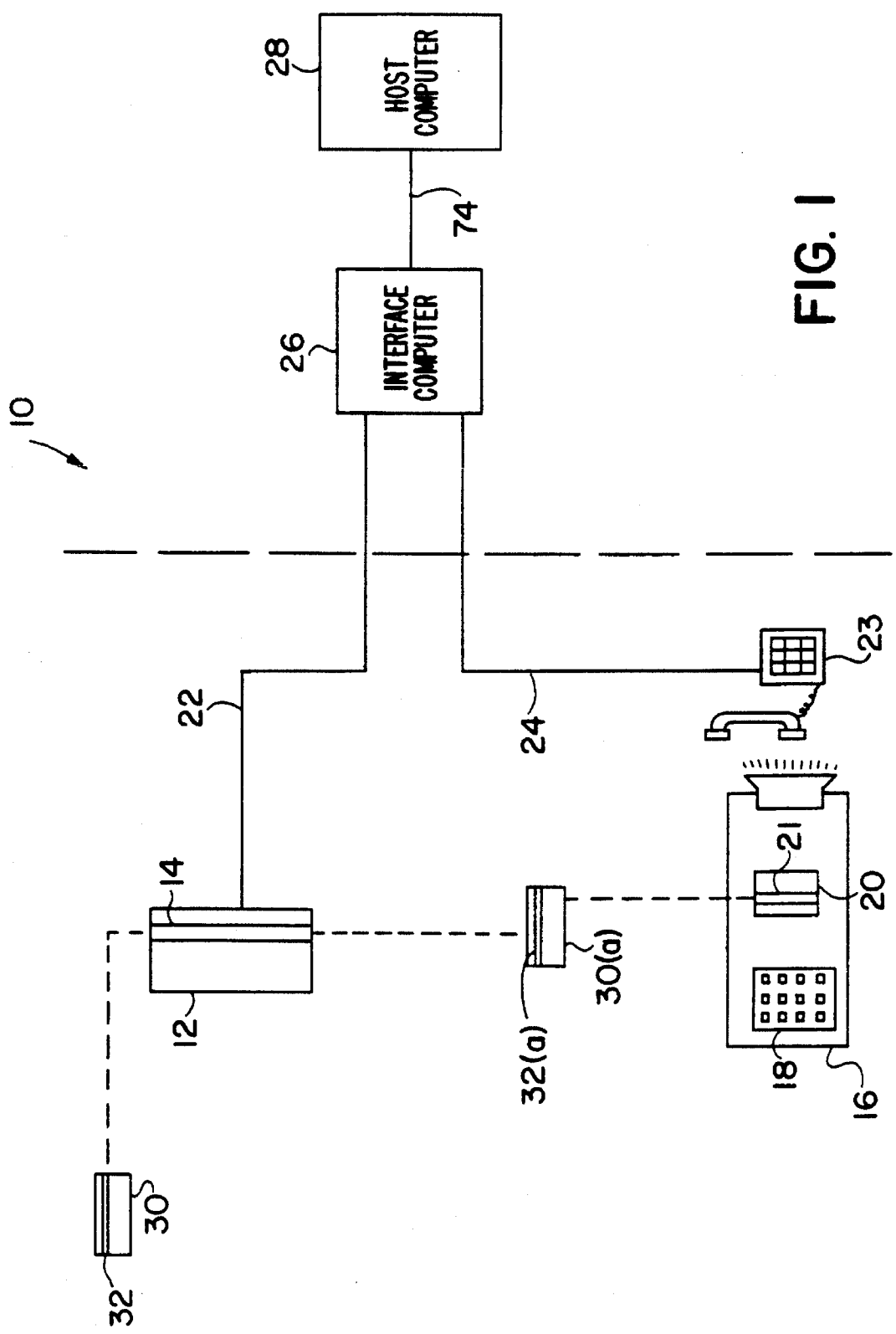
FIG. 1 shows a schematic diagram of a credit card account verification system in accordance with the present invention.

Referring now to FIG. 1, a credit card account verification system 10 suitably comprises an authorization modem 12 including a card reader slot 14, a telephone 23, a special tone dialer ("STD") unit 16 including, inter alia, a keypad 18 and a card writer 20, a credit card 30, an interface computer 26, a host computer 28, a first data transmission line 22 configured to transmit data between authorization modem 12 and interface computer 26, and a second transmission line 24 (e.g., a conventional telephone line) configured to transmit data between STD 16 and interface computer 26.

Conventional credit cards often bear a magnetic strip 32 on their backside. Magnetic strip 32 typically has embedded therein certain information pertaining to the account (e.g., the account number). Conventional authorization modems 12 are configured to "read" the information embedded in strip 32 when card 30 is manually drawn through card reader slot 14.

After the seller draws card 30 through slot 14, modem 12 transmits the extracted account data over data line 22 to interface computer 26. Interface computer 26 interprets the data, as necessary, and interrogates host computer 28.

Host computer 28 generally comprises a comprehensive database maintained by the issuer of the credit card, e.g., a bank, credit card company, or other financial institution. Host computer 28 provides the requested account information to interface computer 26; interface computer 26 thereafter transmits this information back to the seller via data line 22 and modem 12.

In accordance with one aspect of the present invention, the foregoing verification scheme may be advantageously augmented by encrypting the account data in one of the following two methods: (i) manually entering the account holder's password (PIN) into STD 16, encoding the data via circuitry resident in STD 16, generating DTMF tones and transmitting the encrypted data from STD 16, through telephone 23, to interface computer 26 over transmission line 24; or (ii) entering the user's PIN as above, writing the encrypted data onto a card 30(a) by updating an associated magnetic strip 32(a) via card writer 20, "reading" the updated magnetic strip with card reader slot 14, and transmitting the encrypted data from modem 12 to interface computer 26 over data line 22.

In the preferred embodiment illustrated in FIG. 1, authorization modem 12 and/or STD 16 are suitably located at the point of sale ("POS"), i.e., at a seller's place of business. When a purchaser desires to purchase goods or services from the seller, the purchaser (cardholder) presents a suitable credit card or debit card 30 to the seller to secure payment. Before consummating the transaction, the purchaser keys in his password (PIN) on the STD keypad, whereupon STD 16 may either transmit encrypted data directly to interface computer 26 (mode A operation), or it may write the encrypted data onto a magnetic strip associated with a credit card, whereupon the credit card may be drawn through a conventional card reader to thereby transmit the data to interface computer 26.

The manner in which the account data is encrypted in accordance with the invention will now be described.

Figure 2:
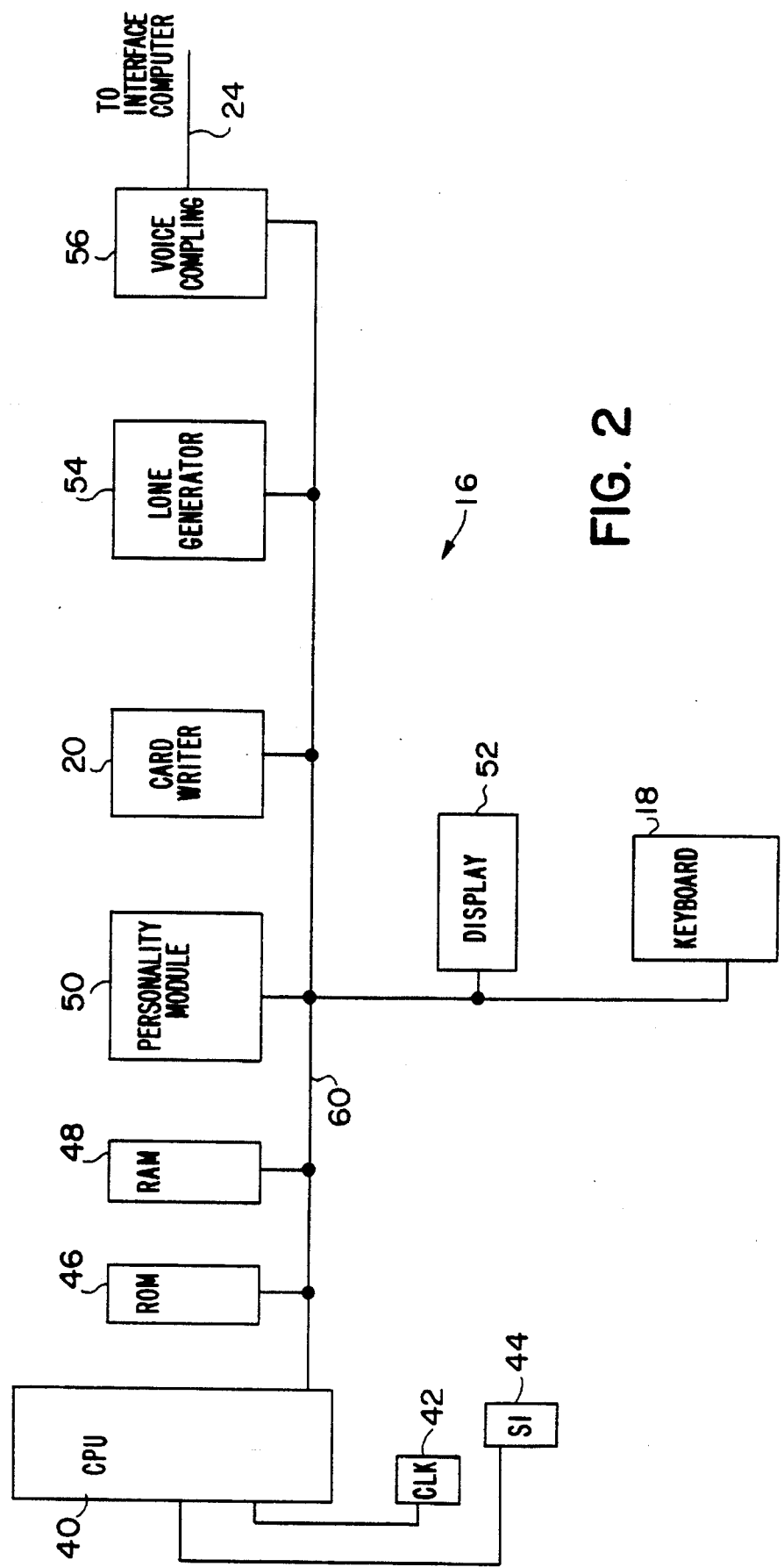
FIG. 2 shows a block diagram setting forth the functional elements of the Special Tone Dialer of FIG. 1.

Referring now to FIG. 2, STD 16 suitably comprises a central processing unit (CPU) 40, a clock module 42, a serial input module 44, a ROM 46, a RAM 48, a personality module 50, a display 52, a tone generator 54, a voice coupling module 56, key pad 18, card writer 20, and suitable data, address, and control busses illustrated schematically as a bus 60. In accordance with one aspect of the present invention, STD 16 may suitably comprise discrete functional components. Alternatively, the functional blocks comprising STD 16 may suitably be integrated into a single customized chip, for example an integrated circuit chip. This chip can then be used as part of any desired computerized application.

Clock module 42 advantageously synchronizes the operation of the various components of STD 16 in a conventional manner. Clock module 42 may also be configured to generate real time data, for example Greenwich Mean Time (GMT) data expressed in terms of one or more of the current year, month, day, hour, and minute. Alternatively, clock module 42 may be configured to generate data which is either time shifted from or otherwise a function of GMT, as desired.

Display 52 and key pad 18 suitably cooperate to permit the user to enter information (via key pad 18) into STD 16 in response to prompts and instructions displayed on display 52. Serial input module 44 is suitably configured to permit the direct application of data into CPU 40 in additional to or in lieu of the application of data via keyboard 18, as desired. Serial input module 44 is advantageously configured to accommodate any convenient communications interface scheme, for example RS232 or RS422 format, optical link, and the like.

CPU 40 may comprise any suitable general purpose processor capable of executing the programs and algorithms conveniently stored in ROM 46. Those skilled in the art will appreciate that software may be embedded in ROM 46 in a conventional manner, or written into ROM 46 via keyboard 18. The software resident in ROM 46 advantageously includes system level supervisory programs, instructions for generating the date and time (e.g., local, GMT, or system time), algorithms and other mathematical functions for encryption, data transmission and tone generation software, and software for controlling the operation of card writer 20. ROM 46 may also store data relating to the credit account number, expiration date, password, owner identification, and other information pertaining to credit card 30 in a manner similar to personality module 50 (discussed below), particularly in an integrated circuit or single chip embodiment of the various functional blocks comprising STD 16.

ROM 46 may be implemented in any suitable format, e.g., EPROM, EEPROM, flash memory, or RAM coupled with a dedicated battery.

RAM 48 is advantageously employed as a conventional "scratch pad" for CPU 40, and may be suitably configured to store information pertaining to one or more credit cards. For example, a particular user of STD 16 may wish to include data in personality module 50 for all of his credit cards, thereby maximizing the utility of STD 16. Personality module is suitably implemented as EPROM, EEPROM, flash memory, or the like.

Tone generator 54 comprises any conventional device for generating standard DTMF signals. Those skilled in the art will appreciate that DTMF signal generators compatible with conventional telephone equipment are readily available.

The output of tone generator 54 is suitably applied to voice coupling module 56, which accordingly generates the tones applied to data line 24, e.g. a conventional telephone line.

Card writer 20 suitably includes a slot 21 through which card 30(a) (FIG. 1) may be manually drawn to update the data resident on magnetic strip 32(a).

In accordance with the illustrated embodiment, STD 16 may be configured to operate in either or both of two modes, namely, as a DTMF transmitter (mode A) or as a magnetic card writer (mode B). More particularly, STD 16 functions as a DTMF transmitter in the following manner.

The information sought to be transmitted by STD 16 to interface computer 26 is assembled by CPU 40. Such information may include, inter alia, the account number, PIN or other account password, and/or credit card expiration date. Those skilled in the art will appreciate that this information may be variously input via serial input module 44 or keyboard 18, or retrieved from ROM 46, RAM 48, and/or personality module 50. However, care should be taken to ensure that confidential information, for example account number, user name, etc., which may be embedded or otherwise stored within STD 16 is securely maintained such that the information may not readily be ascertained by an unauthorized user. Indeed, when an authorized user enters his PIN into STD 16 to thereby initiate a transaction, the encryption and transmission of the account number may be wholly transparent to the user; that is, the user need only remember his PIN number, and need not concern himself with the account number embedded within STD 16. Alternatively, card writer 20 may be configured to function as a card reader, such that some of the foregoing information may be retrieved directly from the magnetic strip on the credit card.

The data to be transmitted is then encrypted by CPU 40 using the mathematical function suitably stored in RON 26, including the GMT or other information relating to the particular encryption scheme or schemes employed by STD 16. In a preferred embodiment, the account holder's PIN may be used to access the subject encryption scheme and, hence, to enable the transmission of encrypted data; the PIN itself, however, need not be encrypted and transmitted. In an alternate preferred embodiment, the account holder's PIN may also be encrypted and transmitted.

The encrypted data is then applied to tone generator 54, whereupon DTMF control signals are generated and applied to voice coupling module 56. In response, voice coupling module 56 generates and applies appropriate DTMF tones to data line 24 corresponding to the encrypted data. The encrypted data is thereafter received and decrypted by interface computer 26, as discussed in greater detail in connection with FIG. 3.

STD 16 may alternatively be operated as a magnetic card writer (mode B) in the following manner.

In accordance with mode B operation, card 30(*a*) suitably comprises a "blank" credit card comprising a magnetic strip which may be continually updated. That is, magnetic strip 32(*a*) on card 30(*a*) initially contains no information. Upon being drawn through card writer 20 (discussed in greater detail below), certain time sensitive encrypted data may be written onto the strip, which data becomes invalid upon the expiration of a predetermined validity window (also discussed below). Thus, card 30(*a*) in accordance with the present invention may only be used within a predetermined threshold time period after it is updated. Thereafter, the card is effectively rendered invalid until it is subsequently re-updated. In this way, the account holder need not have a separate dedicated credit card for each credit card account. Rather, by storing data (e.g., account number, expiration date, etc.) corresponding to a plurality of different credit cards within personality module 50, a singly owner of an STD device in accordance herewith need only enter the PIN number corresponding to a particular credit card (e.g., VISA, MasterCard, Diner's Club, and the like) in order to effect a transaction. Once the PIN corresponding to a particular credit card account is entered into STD 16, processor 40 retrieves the appropriate corresponding account data from, for example, personality module 50, and encrypts and transmits the data as discussed herein. Moreover, the foregoing scheme whereby STD 16 may incorporate data for a plurality of credit card accounts may be employed in either or both of mode A or mode B operation.

With continued reference to FIGS. 1 and 2, the data to be transmitted in accordance with mode B operation is assembled and encrypted as discussed above in conjunction with mode A operation. Rather than (or in addition to) applying the encrypted data to tone generator 54, however, the encrypted data is applied to card writer 20. As the user extracts card 30(*a*) from or, alternatively, draws card 30(*a*) through slot 21 of card reader 20, magnetic strip 32(*a*) is updated to include the aforementioned encrypted data. That is to say, card writer 20 writes the encrypted data onto magnetic strip 30(*a*) in accordance with mechanisms known to those skilled in the art.

The updated card 30(*a*) may then be drawn through slot 14 of authorization modem 12 in a conventional manner to thereby transmit the encrypted data over data line 22 to interface computer 26. Interface computer 26 thereafter receives and decrypts the data as discussed below in connection with FIG. 3.

The updated data written onto card 30(*a*) will remain valid for a predetermined time period ("validity window") in accordance with the common encryption scheme employed by STD 16 and interface computer 26. In similar fashion, the encrypted data applied to tone generator 54 for transmission by voice coupling module 56 to interface computer 26 (mode A) also remains "valid" for such predetermined period. More particularly, the encrypted data should remain valid for a sufficient amount of time to permit convenient transmission of the encrypted data to interface computer 26. This is particularly true in the context of mode B operation where the card owner (purchaser) must update card 30(*a*) (via card writer 20 of STD 16) and thereafter slide the card through slot 14 of the authorization module 12. The encrypted data must thereafter remain valid for sufficient time to permit processing of the data by interface computer 26, as appropriate.

On the other hand, security considerations suggest that the encrypted data should remain valid for as short a time as necessary to process the data. To the extent the encrypted data can be rendered invalid as soon as practicable, the period within which an unauthorized user may defraud the system is concomitantly reduced.

In accordance with a preferred embodiment of the present invention, the time (e.g., GMT) at which the confidential data was encrypted by STD 16 may be transmitted to interface computer 26 together with the encrypted data. Interface computer 26 may then use this time information as a variable in the algorithm resident within interface computer 26 for decrypting the data. Moreover, interface computer 26 may also independently monitor GMT and compare the time at which the encrypted data was received against the time at which the data was originally encrypted by STD 16. If the difference between the two times is relatively short, for example on the order of the time required to perform the transaction and transmit the data, the transaction may be validated. If, however, the difference between these two times exceeds a predetermined threshold, then interface computer 26 (or host computer 28) may appropriately refuse the transaction, as desired. More particularly, if the difference between the time at which the data was encrypted and the time at which the encrypted data is received by interface computer 26 exceed the predetermined threshold, there may be established a presumption of either unauthorized use of STD 16 or that previously transmitted data has been intercepted and retransmitted.

In accordance with an alternate preferred embodiment of the present invention, various techniques may be employed for ensuring that the transmitted, encrypted data remains valid for an optimum amount of time. In accordance with one aspect of the invention, the encryption algorithm (discussed in greater detail below) may be configured as a dynamic function of GMT. As such, one or more parameters comprising the algorithm change periodically, for example every second, minute, predetermined number of minutes, or the like. Thus, if the algorithm is updated each second, the encryption, transmission, and decryption are suitably configured to occur within the span of one second. If the algorithm is updated each minute, on the other hand, the encryption, transmission, and decryption are suitably configured to occur within the span of one minute.

In accordance with an alternate preferred embodiment, STD 16 may be configured to monitor the state of the algorithm and to delay encryption and transmission until a point within the validity window which sufficient time exists to conveniently encrypt, transmit, and decrypt the data prior to the next algorithm update. That is, if STD 16 determines that there is not sufficient time within a current validity window to encrypt, transmit, and decrypt data, it will wait until the beginning of the next validity window to begin the encryption, to thereby ensure that sufficient time exists to encrypt, transmit, and decrypt before the next algorithm update.

In accordance with an additional alternate embodiment, the encrypted data may be transmitted at any point within an update cycle. When the encrypted data is received by interface computer 26, the data is decrypted based on the then current state of the decryption algorithm, and also decrypted based on at least one preceding state of the algorithm, to generate two or more sets of data. Each set may then be sequentially applied to the host computer for verification. If the algorithm was not updated during the transmission process, the first set of data will be accepted by the host computer for verification purposes. If, on the other hand, the algorithm is updated during transmission, the decrypted data corresponding to a previous state of the algorithm will be utilized by the host computer for verification purposes.

In accordance with a further alternate embodiment, STD 16 transmits the encrypted data without regard to whether the algorithm is updated during transmission. If the algorithm is not updated during transmission, the encrypted data will be decrypted as set forth above in connection with the illustrated embodiment. If the algorithm is updated during transmission, interface computer 26 may be configured to send a message to STD 16 indicating that the data was not properly decrypted. In response to this message, STD 16 would simply retransmit the data in accordance with the newly updated algorithm. The data may thereafter be re-encrypted and transmitted as many times as necessary to ensure transmission within a validity window.

Figure 3:
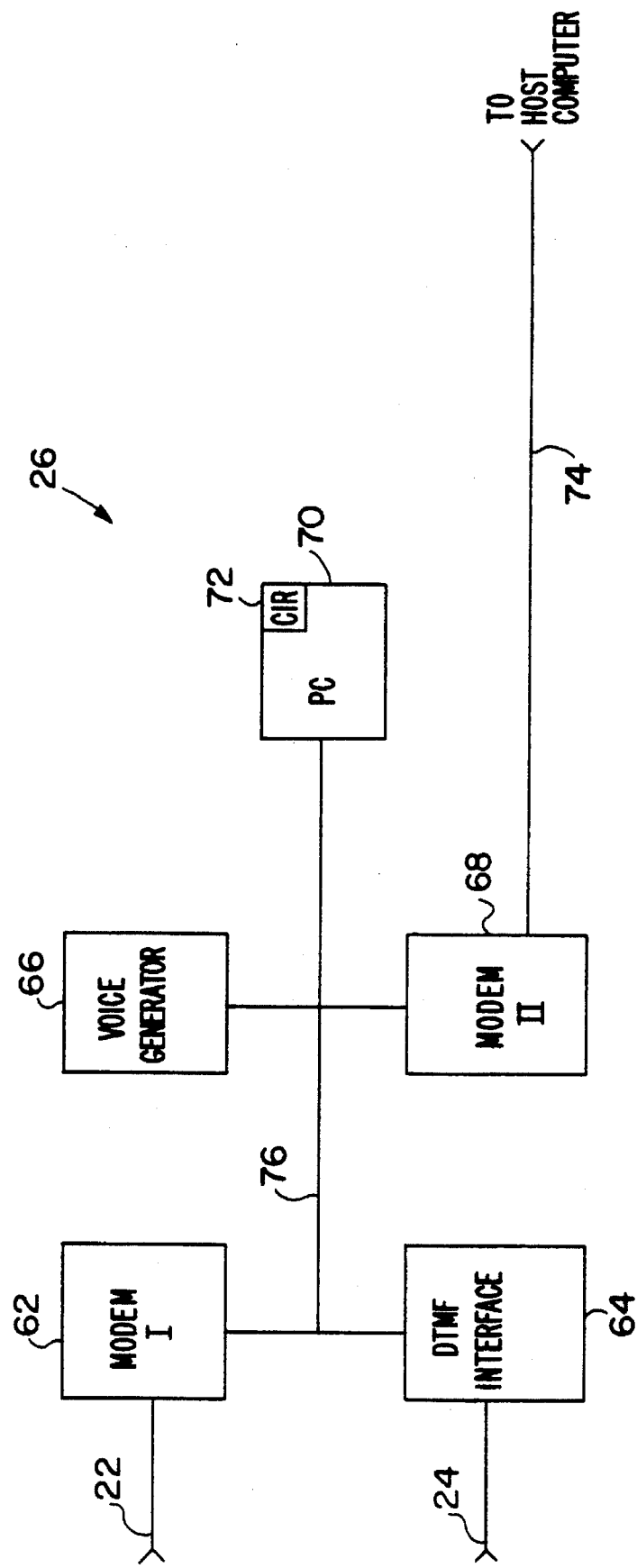
FIG. 3 shows a block diagram of the interface computer shown in FIG. 1.

Referring now to FIG. 3, interface computer 26 suitably comprises a conventional multipurpose programmable computer, for example a personal computer (PC) 70 including a clock module 72, a first modem 62 configured to communicate with authorization modem 12, for example via data line 22, a DTMF interface 64 configured to communicate with STD 16, for example via data line 24, a second modem 68 configured to maintain communication between interface computer 26 and host computer 28, for example via a data line 74, a voice generator 66 configured to generate DTMF tones, indicative of response messages from host computer 28, for application to DTMF interface 64 in a manner analogous to tone generator 54 and voice coupling module 56, and address, data and control busses schematically illustrated as a bus 76. Clock module 72 is suitably configured to generate timing signals governing the operation of interface computer 26. Moreover, clock module 72 may be configured to receive an external timing signal, either continuously or periodically. More particularly, clock module 72 may be configured to receive a signal indicative of GMT. Alternatively, clock module 72 may comprise a clock circuit which replicates GMT but which is periodically calibrated to ensure reasonably satisfactory synchronization with GMT.

During mode A operation of STD 16, i.e., when STD 16 transmits DTMF tones indicative of the encrypted data, DTMF interface 64 receives the DTMF tones from data line 24. DTMF interface 64 transmits the DTMF tones into a format compatible with PC 70. For example, if PC 70 comprises a general purpose digital computer, DTMF interface 64 converts (translates) the incoming tones into an equivalent digital data packet and applies the data packet to PC 70. PC 70 decrypts (decodes) the data to reveal the original account data in accordance with decryption software resident in PC 70. In particular, the decryption software corresponds to the inverse of the mathematical function(s) (or other algorithm(s)) employed by STD 16 during the previous encryption of the account data. Specific implementation of encryption/decryption schemes are discussed in greater detail below.

Upon deriving (decoding) the original account data, PC 70 applies the account data to second modem 68 for transmission to host computer 28. Host computer 28 performs conventional validation and/or verification (e.g., using a look-up table) functions on the data and transmits appropriate response messages back to second modem 68. Particularly, host computer 28 constructs a response message which functions to either approve or refuse the proposed transaction, depending on a number of factors including, inter alia: (1) proper verification of credit card number, account number, PIN, and the like; (2) the sufficiency of funds and/or credit associated with the account; (3) the date, place, and time of the proposed transaction; and (4) whether the card has been reported as lost or stolen. Under the supervision of PC 70, the response messages from host computer 28 are converted into DTMF compatible format by voice generator 66 and thereafter transmitted back to STD 16 via DTMF interface 64.

During mode A operation of STD 16, i.e., when encrypted data is written onto card 30(*a*) and transmitted by authorization modem 12, the encrypted data is received by first modem 6. PC 70 again decodes the data, applies the original account data to host computer 28 for validation/verification, and transmits the appropriate response message back to authorization modem 12 via first modem 62.

Upon receipt of a host generated validation response by either authorization modem 12 (mode B) or STD 16 (mode A), the P.O.S. seller may consummate the sales transaction if the account information is satisfactorily verified or validated; alternatively, the P.O.S. seller may refuse the transaction if the validation response is unsatisfactory.

As discussed above, in order to reduce the incidence of fraud resulting from the interception and unauthorized use of transmitted data, the encryption/decryption scheme of the present invention advantageously functions to render encrypted data invalid shortly after it is transmitted. In accordance with one aspect of the present invention, this is accomplished by employing a dynamic encryption algorithm and correlative decryption algorithm which are functions of time.

In a preferred exemplary embodiment, the dynamic algorithm which encrypts the data is suitably a function of GMT. Those skilled in the art will appreciate, however, that any dynamic function or, indeed, any function whatsoever which is capable of encrypting the data may be employed in the context of this invention.

As a particular example of a function involving GMT, assume that a credit card number (CCN) is codified (encrypted) in the following manner.

Let CCN=4500 1400 6201 1960 be represented by the following two numbers:

CCN 1=4500 1400

CCN 2=6201 1960.

Although the GMT data may be set forth with any suitable degree of resolution, assume the following two-digit representation of the minute, hour, day, and month of any arbitrary GMT:

GMT=38 11 07 06, corresponding to 38 minutes past the hour of 11:00 a.m. (a 24-hour clock is suitably employed) of the seventh day of June, 1992. For purposes of this algorithm, assume further that "ln" indicates the natural logarithm; "EXP" corresponds to a base ten exponential, e.g. 5EXP2=500 (i.e., $5 \times 10^2$), "*" denotes multiplication; and "inv ln" represents the inverse natural logarithm.

Given the foregoing conventions, an exemplary function (algorithm) may be stated as:

$$f(GMT, CCNi) = (YEAR*EXP(-4)) + \ln(GMT) + \ln(CCNi)$$

for i=1,2.

Implementing this function yields the following values:

$$\ln(GMT) = \ln(38110706) = 17.456006$$

$$\ln(CCN1) = \ln(45001400) = 17.622204$$

$$\ln(CCN2) = \ln(62011960) = 17.942838$$

$$YEAR*EXP(-4) = 1992 \times 10^{-4} = 1.992$$

Employing these values in the foregoing function yields the following encryption:

```
CODE 1  =  1.992 + 17.456006 + 17.622204
        =  37.07021
CODE 2  =  1.992 + 17.456006 + 17.942838
        =  37.390844
```

Of course, the foregoing values may be expressed as any desired number of significant digits, recognizing that conventional DTMF transmission typically requires on the order of 30 milliseconds per digit. Accordingly, transmission of the foregoing function would occupy on the order of one-half to one second. In addition, a PIN or other pass word or code word may be suitably appended at the beginning or end of the foregoing encryption.

When the encrypted data is received by the interface computer, it is separated into its fundamental constituents, namely, CODE 1, CODE 2, and PIN, as appropriate. CODE 1 and CODE 2 may then be decrypted, for example by using the following decryption algorithm:

$$CCN1 = \text{inv ln} (CODE\ 1 - YEAR*EXP(-4) - \ln GMT)$$

$$CCN2 = \text{inv ln} (CODE\ 2 - YEAR*EXP(-4) - \ln GMT)$$

The following additional example illustrates the broad variety of GMT-based algorithms which may be employed in the context of the present invention.

Given a vector $A = (A_1, A_2, A_3 \ldots A_n)$ and a matrix B:

$$\underline{\underline{B}} = \begin{matrix} B_{11}, & B_{12}, & B_{13} & \ldots & B_{1m} \\ B_{21}, & B_{22}, & B_{23} & \ldots & B_{2m} \\ B_{31}, & B_{32}, & B_{33} & \ldots & B_{3m} \\ B_{n1}, & B_{n2}, & B_{n2} & \ldots & B_{nm} \end{matrix}$$

the multiplication of A*B results in a vector R of m dimensions, where, $R_j = \Sigma(A_i * B_{ij})$ for i=1–m; that is, $R_1 = A_1*B_{11} + A_2*B_{21} \ldots + A_n*B_{n1}$ Again using CCN=4500 1400 6201 1960, four vectors may be defined as follows:

A1=4500

A2=1400

A3=6201

A4=1960.

A matrix B may then be constructed which includes, for example, four rows of data corresponding to the GMT, and an arbitrary company parameter (code) CP. More particularly, matrix B may comprise a first row corresponding to the minute and hour, a second row corresponding to the day and month, a third row corresponding to the year, and a fourth row corresponding to the CP (e.g. 1234) as follows:

$$\underline{\underline{B}} = \begin{matrix} 3811 \\ 0706 \\ 1992 \\ 1234. \end{matrix}$$

The product of each vector An and each matrix column Bnm yields a sum Rnm, for example:

$$R_{12} = A_{11}*B_{12} + A_{12}*B_{22} + A_{13}*B_{32} + A_{14}*B_{42}$$

$$R_{12} = 4*8 + 5*7 + 0*9 + 0*2 = 67$$

The product of a particular vector A1 and the entire matrix B thus yields a vector R1 as follows:

$$R_1 = (R_{11}, R_{12}, R_{13}, R_{14})$$

$$R_1 = (012, 067, 004, 034)$$

Generalizing the foregoing, a four-dimensional vector $R_i = R_1, R_2, R_3, R_4$ may thus be generated which comprises, for example, a sequence of sixteen separate three-digit numbers.

Upon receipt of vector Ri by interface computer 26, the vector may be decoded by interpreting each three digit sequence as a sum and each sequence of four sums as a vector. By multiplying each vector by the inverse of matrix B, the original account data (A1, A2, A3, A4) may be derived.

In accordance with a further aspect of the invention, credit card transactions may be effected through the use of DTMF transmission with or without the use of STD 16 in the following manner.

A customer places a telephone call to a seller, whereupon the buyer and seller agree upon the terms of a sales transaction. The buyer and the seller exchange PIN numbers, which may conveniently correspond to the buyer's and the seller's respective vendor numbers recognizable by the host computer.

The buyer calls the interface computer and, via STD 16 or via standard TOUCH-TONE® DTMF transmission, transmits the buyer's account number (e.g. credit card number), the buyer's PIN, the transaction amount, and the seller's vendor number. The seller also calls the interface computer and transmits the buyer's credit card number, PIN and the seller's vendor number, either via a device analogous to STD 16 or other encryption device or, alternatively, via conventional TOUCH-TONE DTMF transmission. The interface computer decrypts the data from the buyer and seller, as necessary, and transmits the data to the host computer. The host computer constructs a response message, for example a transaction verification or refusal message, and transmits the message to one or both of the buyer and seller.

In an alternative embodiment of the foregoing method, the seller's telephone is suitably equipped with conference call capability, whereupon the seller switches to conference mode once the buyer and seller have agreed to the terms of a transaction. In response to synthesized voice prompts from the host computer, the buyer and seller interactively enter the relevant account and transaction information, again either via STD 16, a suitable analogous encryption device, or via standard TOUCH-TONE DTMF transmission. Upon constructing an appropriate response message, the host computer transmits the message back to the seller, whereupon the buyer and seller may be simultaneously notified as to whether the transaction will be validated or refused.

Although the invention has been described herein in conjunction with the appended drawing figures, those skilled in the art will appreciate that the scope of the invention is not so limited. Various modifications in the selection and arrangement of the various components and method steps discussed herein may be made without departing from the spirit of the invention as set forth in the appended claims.

We claim:

1. A method of encrypting, transmitting, and decrypting an account number based on the use of a reversible mathematical algorithm, the algorithm being a function of time and date, and the algorithm having said account number as argument, the method comprising the steps of:

storing said account number in the memory of a hand-held special tone dialing (STD) device;

storing a first mathematical algorithm in the memory of said STD device;

storing a second algorithm, which second algorithm is the mathematical inverse of said first algorithm, in a central computer;

entering a personal identification number (PIN) onto a keypad of said STD device to thereby retrieve said account number and said first algorithm;

executing said first algorithm using the date and time of encryption to thereby encrypt said account number and the time and date of encryption as a function of said first algorithm;

applying, by said central computer, said second algorithm to said encrypted account number to thereby compute said account number as the result of said second algorithm being applied to said encrypted account number;

looking up at least a portion of said account number in an account data base maintained by said central computer to facilitate the authorization of a financial transaction involving the account to which said account number is associated; and transmitting a response message from said central computer to said STD device relating to the authorization of said financial transaction.

2. The method of claim 1 wherein the time and date are the Greenwich Mean time and date.

3. The method of claim 1 wherein said applying step is synchronized to said executing step by use of a pre-set window of time.

4. The method of claim 1 wherein said account number includes said PIN.

5. The method of claim 1 wherein said account number includes an authentication number associated with said STD.

6. The method of claim 1 wherein said first and said second algorithms are each a function of date and time in terms of year, month, day of month, hour, minute, and second, such that said first algorithm implements a unique, non-repeating mathematical function each time it is executed.

7. An encryption and decryption system comprising a transmitting device and a receiving device wherein the transmitting device comprises:

a keypad for entering a PIN;

means for entering confidential information to be transmitted to said receiving device;

means for storing an authentication number which is unique for each transmitting device;

means for determining date and time;

means for computing a first reversible mathematical function in response to the entry of the personal identification number, said first function including the year, month, day, hour, and minute of encryption;

means for encrypting said consolidated information into a message based upon said first function;

means for transmitting said message and said authentication number to the receiving device;

a card writer circuit configured to write said message in a digital format onto a configurable magnetic strip associated with a dynamically reconfigurable transaction card; and the receiving device comprises:

means for receiving said message and said authentication number from the transmitting device;

means for determining date and time;

means for computing a second mathematical function which is the mathematical inverse of said first function;

means for applying said second function to said message to thereby decrypt said message and reveal said confidential information;

means for storing a data base of authentication numbers; and means for comparing said received authentication number to the data base of authentication numbers to thereby confirm the authenticity of said transmitting device; and means for applying said confidential information to a data base of account numbers to facilitate the approval of a financial transaction.

8. The system of claim 7 wherein said transmitting means of said transmitting device is configured to transmit said confidential information through use of Dual Tone Multiple Frequency tones transmitted through regular telephone lines.

9. A system according to claim 7 including a plurality of similar transmitting devices, each one of the transmitting devices having a unique authentication number and at least one receiving device wherein all of the authentication numbers are stored in a data base, the authentication number being included within the encrypted information transmitted to the receiving device together with unencrypted information identifying the specific individual operating the transmitting device, the receiving device decrypting the encrypted information and comparing the decrypted authentication number with the corresponding authentication number for the specific transmitting device recorded in the data base.

10. The system of claim 7, further comprising:
- a wallet-sized transaction card bearing a dynamically configurable magnetic strip for interaction with said card writing circuit of said transmitting device such that said card writing circuit writes said message onto said configurable magnetic strip; and
- a point of sale (POS) device having a card swipe slot configured to receive said transaction card and read said message, the POS device being further configured to transmit said message to said receiving device along conventional telephone lines.

11. The system of claim 7, wherein:
said confidential information comprises a credit card account number;
said first function includes a natural logarithmic function of said credit card account number and a natural logarithmic function of at least a portion of said year, month, day, hour, and minute information.

12. The system of claim 7, wherein:
said confidential information comprises a credit card account number; and
said first function includes:
  (i) one of a logarithmic and an exponential function of said credit card account number; and
  (ii) one of a logarithmic and an exponential function of at least one of said year, month, day, hour, and minute information.

* * * * *